(12) United States Patent
Mantzel et al.

(10) Patent No.: US 8,648,919 B2
(45) Date of Patent: Feb. 11, 2014

(54) METHODS AND SYSTEMS FOR IMAGE STABILIZATION

(75) Inventors: William E. Mantzel, Atlanta, GA (US); Kenneth I. Greenebaum, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 13/154,375

(22) Filed: Jun. 6, 2011

(65) Prior Publication Data
US 2012/0307085 A1 Dec. 6, 2012

(51) Int. Cl.
*H04N 5/228* (2006.01)

(52) U.S. Cl.
USPC .................................. 348/208.6; 348/208.99

(58) Field of Classification Search
None
See application file for complete search history.

(56) References Cited

U.S. PATENT DOCUMENTS

| | | | |
|---|---|---|---|
| 5,430,480 A | | 7/1995 | Allen et al. |
| 5,627,905 A | | 5/1997 | Sebok et al. |
| 5,717,611 A | | 2/1998 | Terui et al. |
| 7,509,038 B2 * | | 3/2009 | Poon et al. .............. 396/52 |
| 7,714,892 B2 | | 5/2010 | Clark, II et al. |
| 7,796,872 B2 | | 9/2010 | Sachs et al. |
| 7,817,187 B2 | | 10/2010 | Silsby et al. |
| 8,068,140 B2 | | 11/2011 | Helbing |
| 2004/0252200 A1 * | | 12/2004 | Thomas ................. 348/208.4 |
| 2008/0030587 A1 | | 2/2008 | Helbing |
| 2009/0021588 A1 | | 1/2009 | Border et al. |
| 2009/0052743 A1 * | | 2/2009 | Techmer .................. 382/107 |
| 2009/0160957 A1 | | 6/2009 | Deng et al. |
| 2009/0174782 A1 | | 7/2009 | Kahn et al. |
| 2009/0213234 A1 * | | 8/2009 | Chen et al. ............. 348/208.4 |
| 2009/0219402 A1 | | 9/2009 | Schneider |
| 2010/0053347 A1 * | | 3/2010 | Agarwala et al. ....... 348/208.99 |
| 2010/0208087 A1 | | 8/2010 | Ogawa |
| 2010/0214423 A1 * | | 8/2010 | Ogawa ................... 348/208.4 |
| 2010/0329582 A1 | | 12/2010 | Albu et al. |
| 2011/0043613 A1 * | | 2/2011 | Rohaly et al. ............. 348/50 |

(Continued)

FOREIGN PATENT DOCUMENTS

| | | |
|---|---|---|
| EP | 0358196 A1 | 3/1990 |
| JP | 2007-097195 | 4/2007 |

(Continued)

OTHER PUBLICATIONS

"Camera CalibrationToolbox for Matlab", http://www.vision.caltech.edu/bouguetj/calib_doc/htmls/parameters.html, Feb. 16, 2011, pp. 3 total.

(Continued)

*Primary Examiner* — Albert Cutler
(74) *Attorney, Agent, or Firm* — Blakely, Sokoloff, Taylor & Zafman LLP

(57) ABSTRACT

Several methods, devices and systems for stabilizing images and correcting rolling shutter effects are described. In one embodiment, a computer implemented method for image stabilization for an image-capturing device with associated calibration data includes determining motion data for the image-capturing device using a motion-estimating device. The method also includes matching motion data to a sequence of frames captured by the image-capturing device to determine motion data for each frame, constructing a target motion path of the image-capturing device based on the motion data for each frame, and computing a desired motion correction from a motion path observed in the motion data to the target motion path.

22 Claims, 15 Drawing Sheets
(4 of 15 Drawing Sheet(s) Filed in Color)

(56) References Cited

U.S. PATENT DOCUMENTS

| | | | |
|---|---|---|---|
| 2011/0085049 A1 | 4/2011 | Dolgin et al. | |
| 2011/0109755 A1 | 5/2011 | Joshi et al. | |
| 2011/0176043 A1 | 7/2011 | Baker et al. | |
| 2012/0105654 A1* | 5/2012 | Kwatra et al. | 348/208.4 |
| 2012/0120264 A1* | 5/2012 | Lee et al. | 348/208.4 |

FOREIGN PATENT DOCUMENTS

| | | |
|---|---|---|
| WO | WO 2007/045714 A1 | 4/2007 |
| WO | WO 2008/151802 A1 | 12/2008 |
| WO | WO 2010/116366 A1 | 10/2010 |

OTHER PUBLICATIONS

Wikipedia, "Rolling Shutter", http://en.wikipedia.org/wiki/Rolling_shutter, Dec. 17, 2010, pp. 2 total.

PCT International Search Report and Written Opinion of the International Searching Authority for PCT/US2012/038999, mailed Aug. 24, 2012.

PCT Search Report and Written Opinion of the International Searching Authority for PCT/US2012/038569, mailed Jul. 27, 2012.

Extended European Search Report for EP 12170153.6 mailed Sep. 3, 2012, 7 pages.

Sinha, Sudipta N., et al., Piecewise Planar Stereo for Image-based Rendering, *IEEE*, Inproceedings, Sep. 29, 2009, 8 pages.

* cited by examiner

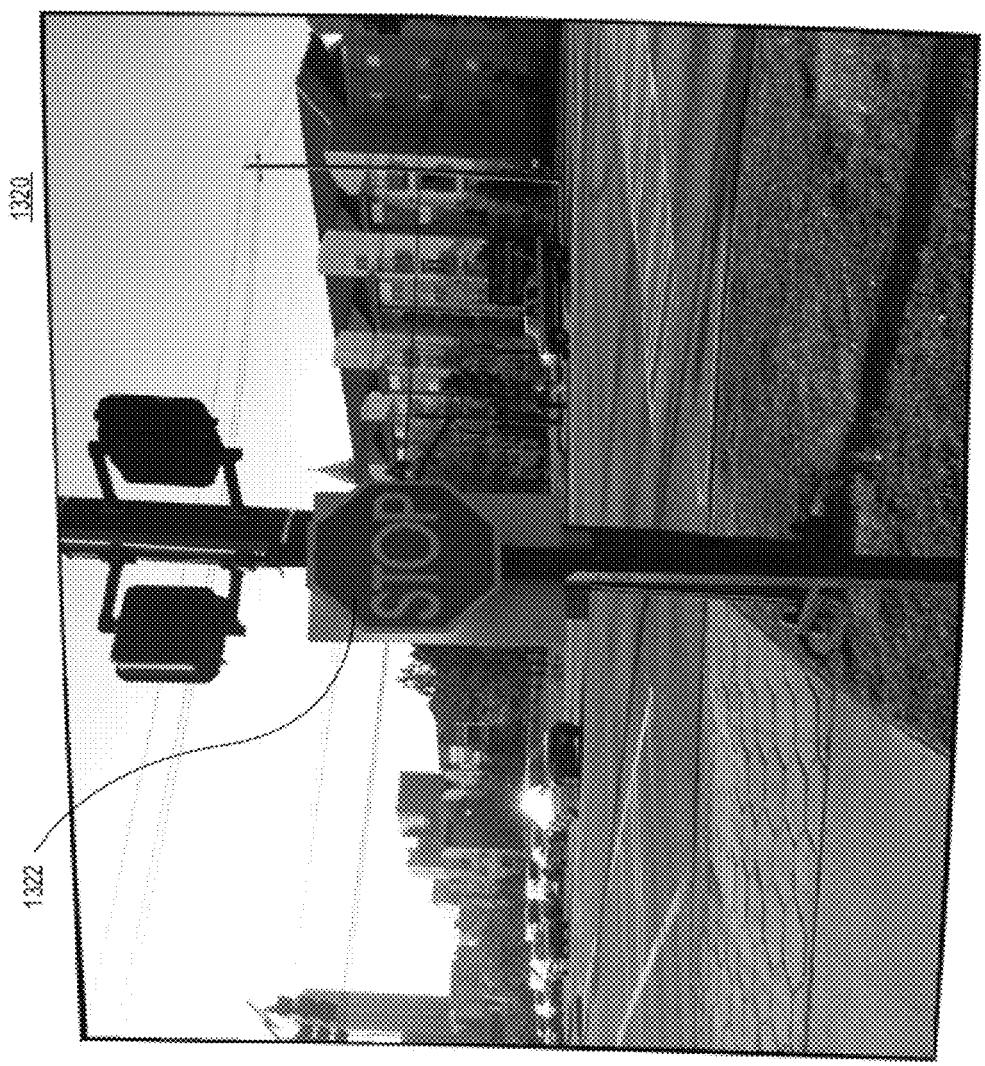

METHODS AND SYSTEMS FOR IMAGE STABILIZATION

Embodiments of the invention are generally related to methods and systems for image stabilization using a motion-estimating device.

BACKGROUND

Image-capturing devices include cameras, portable hand-held electronic devices, and other electronic devices. The images captured by image-capturing devices may be compromised based on motion of the image-capturing devices. For example, vibration, camera shake, or rotation of the camera may blur images.

One prior approach uses software that compares similar portions of different frames and adjusts the output image based on the comparison. This approach typically compensates for translational motion, but fails to compensate for rotational motion.

Some image-capturing devices may use what could be referred to as a rolling shutter as a method of image acquisition in which each frame is recorded not from a snapshot of an entire frame at a single point in time, but rather by scanning across the frame, one line at a time, either vertically or horizontally. In other words, not all parts of the image are recorded at exactly the same time, even though the whole frame is displayed at the same time during playback. At least some CMOS image sensors have a rolling shutter. Rolling shutter produces predictable distortions of fast-moving objects or when the sensor captures rapid flashes of light. This method is implemented by rolling (moving) the shutter across the exposable image area instead of exposing the image area all at the same time. Rolling shutters can cause such effects as skew and wobble. Skews occur when the image bends diagonally in one direction or another as the camera or subject moves from one side to another, exposing different parts of the image at different times. Wobble is most common in hand-held shots at telephoto settings and most extreme in cases when the camera is vibrating due to being attached to a moving vehicle. The rolling shutter causes the image to wobble unnaturally and bizarrely. This is often called the jello effect.

Prior approaches for stabilizing images captured with a rolling shutter may include post-processing techniques. These techniques typically compensate for translational motion, but fail to compensate for rotational motion.

SUMMARY

Several methods, devices and systems for stabilizing images and correcting rolling shutter effects are described. In one embodiment, an image-capturing device includes a camera and a motion-estimating device. The image-capturing device utilizes camera calibration data in one embodiment to map image coordinates of an image plane of the image sensor into normalized image coordinates of a coordinate space. The motion-estimating device can determine motion data (e.g., three dimensional rotation data) for the device. The device matches motion data to a sequence of frames captured by the device to determine motion data for each frame. The device estimates an estimated motion path of the device based on the motion data. The device constructs a target motion path for the image-capturing device based on the estimated motion path. The device computes a desired motion correction based on the estimated motion path and the target motion path. Then, the device utilizes camera calibration data to resample each frame to generate a corrected sequence of stabilized frames according to the desired motion correction.

For example, a user may capture a sequence of images with the device. The motion path is constructed based on motion data that indicates sudden movement or subtle movement (e.g., camera shake from a user, vibration, rotation of camera, etc.). The stabilized frames compensate for the unintended motion of the device during image capture.

In another embodiment, an image capturing system includes a rolling shutter image sensor that may cause a rolling shutter artifact (e.g., warping). The system includes a motion-estimating device to detect motion data and a processing system that is configured to perform an automatic rolling shutter correction mechanism. The correction mechanism utilizes calibration data based on a relationship between pixel locations in an image plane of the image sensor and their corresponding rays of light in a coordinate space (e.g., three dimensional space), determines pixel velocity components based on the calibration data, and estimates for each image an aggregate pixel velocity based on an aggregation of the pixel velocity components and corresponding rotational velocity values, which are determined from the motion data. The correction mechanism resamples each image to generate a new corrected image that is based on the aggregate pixel velocity.

Other embodiments are also described. Other features of the present invention will be apparent from the accompanying drawings and from the detailed description which follows.

BRIEF DESCRIPTION OF THE DRAWINGS

The patent or application file contains at least one drawing executed in color. Copies of this patent or patent application publication with color drawings will be provided by the Office upon request and payment of the necessary fee.

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 13A-13D illustrate a sequence of images for showing a rolling shutter correction in one embodiment of the present invention.

DETAILED DESCRIPTION

Several methods, devices and systems for stabilizing images and correcting rolling shutter artifacts are described. In one embodiment, an image-capturing device includes an image sensor (e.g., camera) and a motion-estimating device. The motion-estimating device can, in one embodiment, determine motion data for the device. The device matches motion data to a sequence of frames captured by the device to determine motion data for each frame. The device constructs a target motion path for the image-capturing device based on the motion data for each frame. The device computes a desired motion correction from an estimated motion path observed in the motion data to the target motion path. Then, the device resamples each frame to generate stabilized frames based on the desired motion correction.

In another embodiment, an image capturing system includes a rolling shutter image sensor that may cause a rolling shutter artifact (e.g., warping). The system includes a motion-estimating device to detect motion data and a processing system that is configured to perform an automatic rolling shutter correction mechanism.

Figure 1:
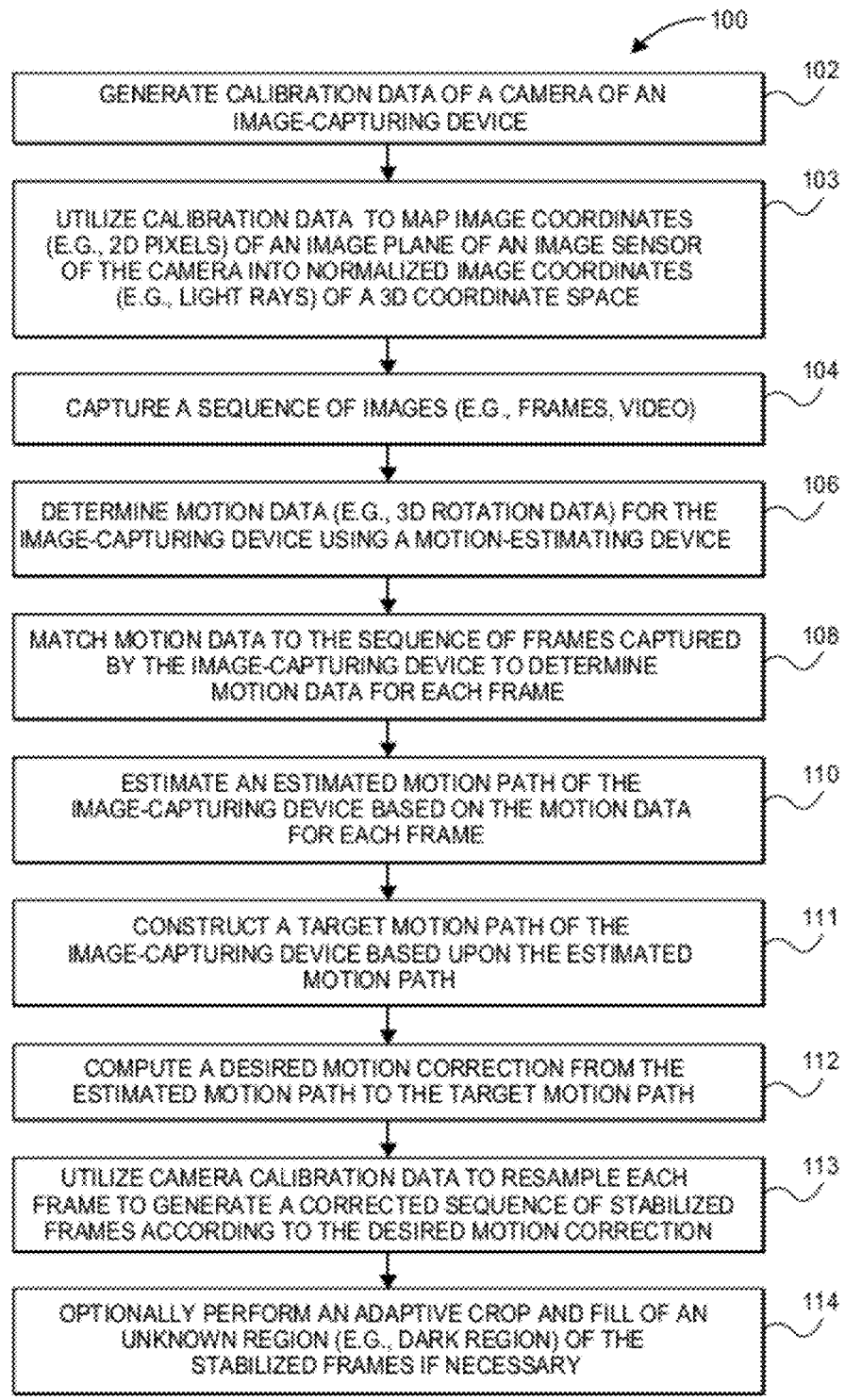
FIG. 1 illustrates a flow diagram in one embodiment of the present invention for a computer-implemented method 100 of stabilizing images (e.g., sequence of images, video) captured with an image-capturing device.

FIG. 1 illustrates a flow diagram in one embodiment of the present invention for a computer-implemented method 100 of stabilizing images (e.g., sequence of images, video) captured with an image-capturing device. The computer-implemented method 100 is performed by processing logic that may comprise hardware (circuitry, dedicated logic, etc.), software (such as is run on a general purpose computer system or a dedicated machine or a system), or a combination of both. The processing logic sends information to and receives information from an image sensing unit having a microprocessor and image sensors. The image sensing unit may send frames of metadata (e.g., focal-number, exposure time, white balance) to the processing logic. Pixel values are read from the image sensors to generate image data. Frames are sent at a certain time interval (e.g., 1/15 of a second) to the processing logic. The frames are stabilized by correcting for a rotational path of the image-capturing device as discussed below.

At block 102, processing logic (e.g., one or more processing units) generates calibration data of a camera of the image-capturing device. The calibration data is utilized to map image coordinates (e.g., two dimensional pixels) of an image plane of an image sensor of the camera into normalized image coordinates (e.g., light rays) of a three dimensional coordinate space at block 103. The field of view and radial distortion of the camera are determined for the generation of the calibration data. In one embodiment, the field of view is 60.8× 47.5 degrees and the radial distortion is approximately $\kappa_1$=0.1 and $\kappa_4$=−0.007. The calibration may be an offline one time process. At block 104, the processing logic (e.g., one or more processing units) captures a sequence of images (e.g., frames, video). At block 106, the processing logic determines motion data (e.g., three dimensional rotation data) for the device using the motion-estimating device. In one embodiment, the motion-estimating device can be a gyroscope or an accelerometer or a combination of both. The gyroscope may provide three dimensional rotation data and the accelerometer may provide three dimensional translation data (six degrees of freedom). Determining the three dimensional motion data for each frame may include determining rotational velocity vectors in three dimensions for each frame.

At block 108, the processing logic matches motion data to the sequence of frames captured by the image-capturing device to determine three dimensional motion data for each frame. Matching motion data to the sequences of frames may include translating time stamps of the motion-estimating device into video time of the frames and also integrating rotational velocity data (e.g., rotational velocity vectors) received from the motion-estimating device to estimate interframe rotation (e.g., $\Delta\Theta[\kappa]$). A live bias estimate between time stamps of the motion-estimating device and video time of the frames may be available using a long-term average (e.g., 5 minutes).

At block 110, the processing logic estimates an estimated motion path (e.g., observed motion path) of the image-capturing device based on the three dimensional motion data for each frame. The estimated motion path is constructed for motion data that indicates sudden movement or subtle movement (e.g., camera shake from a user, vibration). The estimated motion path may be rough or jagged depending on the movement of the camera. At block 111, the processing logic constructs a target motion path of the image-capturing device based upon the estimated motion path. The target motion path can be a smoothed (e.g., filtered) version of the estimated motion path. At block 112, the processing logic computes a desired motion correction from the estimated motion path to the target motion path. At block 113, the processing logic utilizes camera calibration data to resample each frame to generate a correct sequence of stabilized frames according to the desired motion correction. At block 114, the processing logic optionally performs an adaptive crop and fill of an unknown region (e.g., dark region) of the stabilized frames if necessary. The operations of the method 100 provide preprocessing that may be part of a compression algorithm of the frames or decoupled from the compression algorithm. The compressed video frames may require less memory space or provide higher image quality at a lower bit rate based on the operations of the method 100.

In certain embodiments, the motion-estimating device can be a gyroscope, an accelerometer, or any combination thereof in single or multi physical packages.

Additional details of the image stabilization will be explained below.

Figure 2:
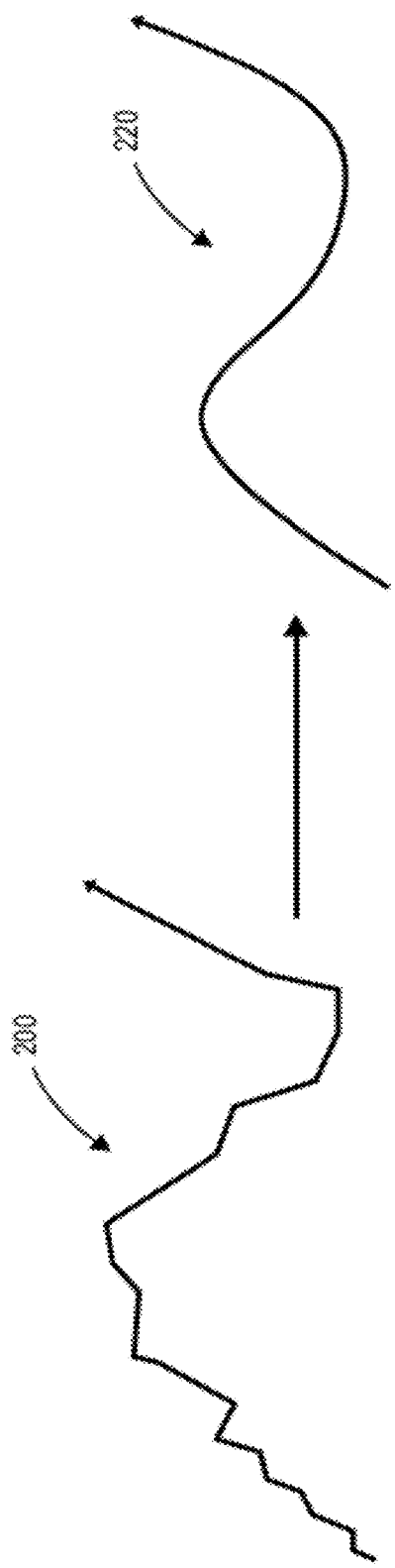
FIG. 2 illustrates the construction of motion paths of an image-capturing device in one embodiment of the present invention.

FIG. 2 illustrates the construction of motion paths of an image-capturing device in one embodiment of the present invention. The processing logic constructs a rough motion path 220 of the image-capturing device based on the three dimensional motion data for each frame. The processing logic can apply a filter in each dimension, such as a low pass or predictive filter, (possibly inducing a short delay to construct a smooth motion path 220 from the rough motion path 200. Smooth motion path 220 represents a desirable target path of the image-capturing device during a time of image capture.

Figure 3:
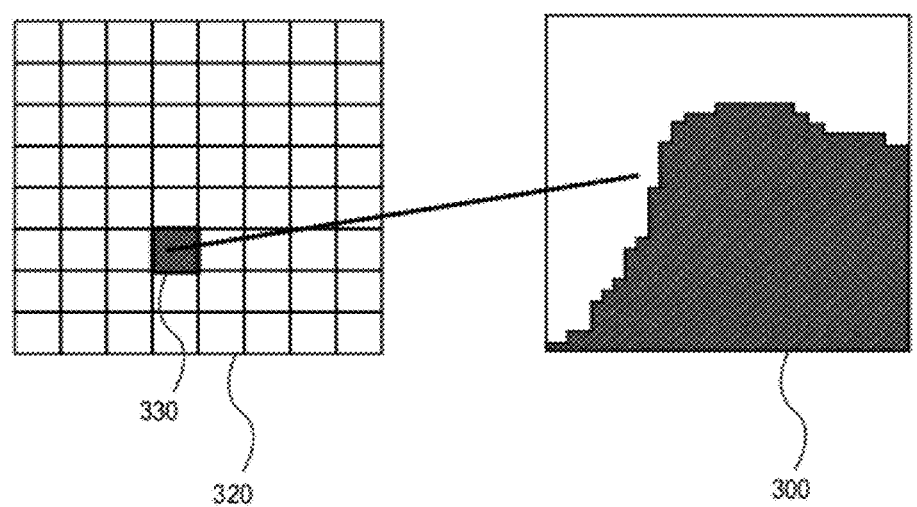
FIG. 3 illustrates frame resampling to be applied to an exploded view of a subset of a frame in one embodiment of the present invention.
Figure 4:
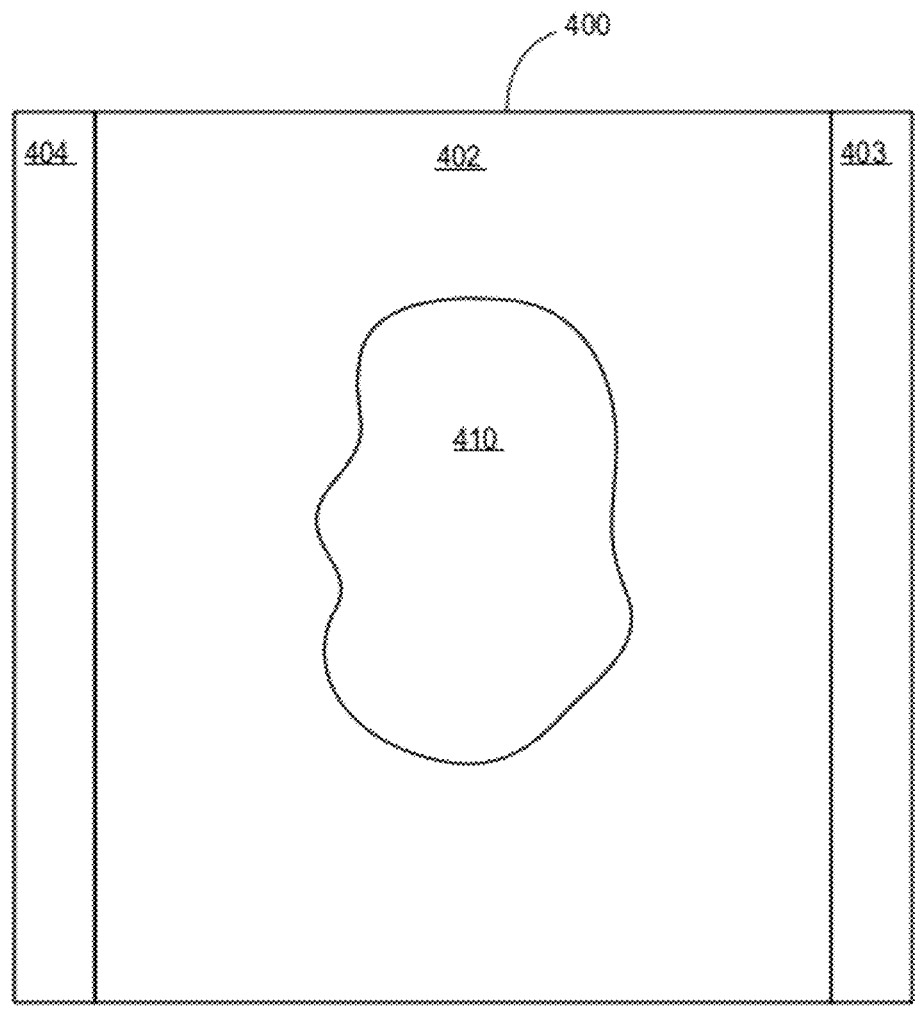
FIG. 4 illustrates an example of an image 400 in one embodiment of the present invention.

FIG. 3 illustrates frame resampling to be applied to an exploded view of a subset of a frame in one embodiment of the present invention. The processing logic can apply frame resampling to the exploded view 300. The frame resampling uses the smooth motion path 220 to correct pixels in the subset 330 of the frame 320. The processing logic may artificially rotate an observer's viewing direction (e.g., user's viewing direction) based on the difference between motion path 220 and motion path 200. The frame resampling uses interpolation (e.g., bilinear interpolation) to construct new frames.

Frame 4 illustrates in an example of an image 400 in one embodiment of the present invention. A central region 402 includes an object 410 to be captured. Peripheral regions 403 and 404 may be dark regions of the image. The regions 403 and 404 can be cropped or eliminated from the image 404. Pixel values may be missing for these regions. These values can be filled in based on adjacent frames or in painting techniques. Alternatively, the cropped region is constrained within the original frame.

The method 100 provides image stabilization to correct for rotational motion and vibration of an image-capturing device. Translational vibration accounts for approximately 10% of vibration and requires depth knowledge to correct. Rotational vibration generally accounts for the large majority of vibration-induced distortions and does not require depth knowledge to correct. Short term rotational offsets may be accurate to within approximately 1 milliradian. This method 100 can also be used for intermediate frame generation and rolling shutter correction. A roller shutter artifact may occur because scan lines are read one at a time from an image sensor (e.g., CMOS image sensor) and the camera itself moves during the image capture time period.

Figure 5:
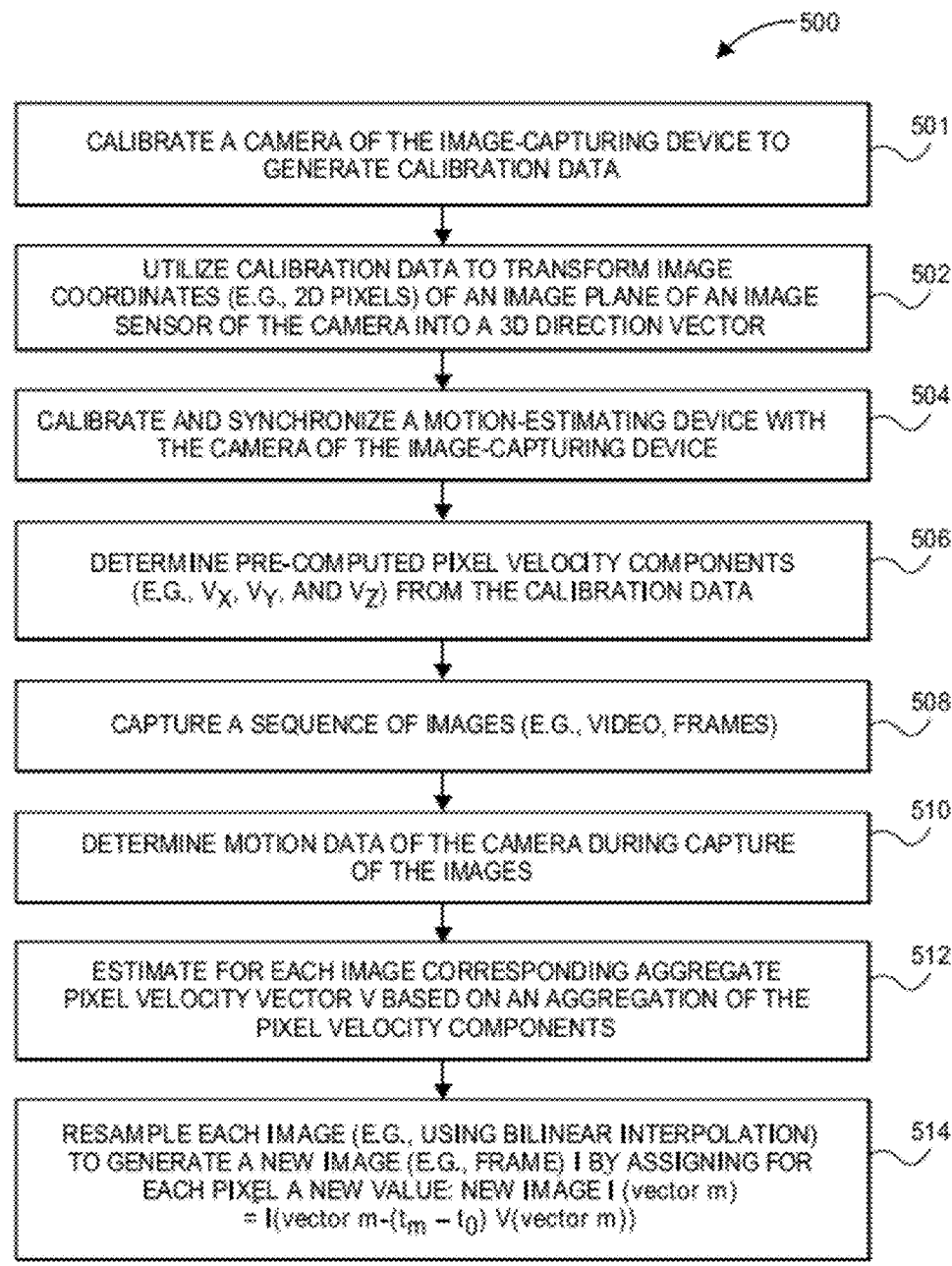
FIG. 5 illustrates a flow diagram in one embodiment of the present invention for a computer-implemented method 500 of a rolling shutter correction of images (e.g., sequence of images, video) captured with an image-capturing device.

FIG. 5 illustrates a flow diagram in one embodiment of the present invention for a computer-implemented method 500 of a rolling shutter correction of images (e.g., sequence of images, video) captured with an image-capturing device. The computer-implemented method 500 is performed by processing logic that may comprise hardware (circuitry, dedicated logic, etc.), software (such as is run on a general purpose computer system or a dedicated machine or a system), or a combination of both. The method 500 determines a value of a pixel a certain time period ago or in the future (e.g., 1 millisecond, 2 millisecond) to correct for rolling shutter effects.

At block 501, processing logic (e.g., one or more processing units) calibrates a camera of the image-capturing device in order to generate calibration data. At block 502, the calibration data is utilized in order to transform image coordinates (e.g., two dimensional pixels) of an image plane of an image sensor of the camera into a three dimensional direction vector. A calibration model is a parametric way of describing the connection between pixel locations in the image plane and their corresponding rays of light in the three dimensional space from the perspective of a camera observer. A three dimensional rotation can be applied to the direction vector. An application of the three dimensional rotation and the direction vectors results in determining where a pixel would move under a hypothetical camera rotation in three dimensional space. The calibration may be an offline one time process.

The calibration parameters may include numerous parameters as described herein. In one embodiment, the variable parameters include focal length f or equivalently field of view and two more parameters to describe radial distortion κ. A video frame may include a center point c in the middle of the video frame (e.g., c=[512, 384] for a 1024×768 video frame). The skew may be zero. The focal length $f_x$ can be modeled as approximately $1.1823*(2c_x)$ and $f_y$ can be modeled as approximately $1.1966*(2c_x)$. Alternatively, $f_x=f_y=1.19*(2c_x)$. All radial distortion terms κ can be set to zero, except $κ_1=0.1$ and $κ_4=-0.007$. Thus, a function F is obtained that converts normalized pixel coordinates (e.g., x vector) to actual pixel coordinates (e.g., m vector) as indicated by the following equation.

$$m\text{vector}=F(x\text{vector})$$

The inverse of F normalizes actual pixel coordinates to the image plane (e.g., x vector=$F^-$ (m vector)).

At block 504, the processing logic calibrates and synchronizes a motion-estimating device with the camera of the image-capturing device. This synchronization may include translating time stamps of the motion-estimating device into video time of the captured images. A live bias estimate between time stamps of the motion-estimating device and video time of the frames may be available using a long-term average (e.g., 5 minutes).

At block 506, the processing logic determines pre-computed predicted pixel velocity components (e.g., $V_x$, $V_y$, and $V_z$) from the calibration data. The pixel velocity components may be determined in two dimensions from the calibration data. At block 508, the processing logic (e.g., one or more processing units) captures a sequence of images (e.g., video, frames). At block 510, the processing logic determines motion data of the camera during capture of the images. The motion data may include rotational velocity vector w (e.g., $w_x$, $w_y$, and $w_z$). At block 512, the processing logic estimates for each image a corresponding aggregate pixel velocity vector V based on an aggregation of the pixel velocity components. This aggregation may include a weighted sum of the components $w_x V_x$, $w_y V_y$, and $w_z V_z$. In one embodiment, the rotational velocity weights $w_x$, $w_y$, and $w_z$ are scalars and the pixel velocity components (e.g., $V_x$, $V_y$, and $V_z$) are functions. At block 514, the processing logic resamples each image (e.g., using bilinear interpolation) to generate a new image (e.g., frame) Ĩ by assigning for each pixel a new value as indicated by the following equation.

$$\text{new image} \tilde{I}(\text{vector}m)=I(\text{vector}m-(t_m-t_0)*V(\text{vector}m))$$

The time when row m was captured is represented by $t_m$ and an initial arbitrary time (e.g., first row, middle row, etc.) for image capture is represented by $t_o$. The new image Ĩ may include new pixel locations based on the movement of the camera. A new pixel location may not be located on a grid location of the new image and may be interpolated based on a certain number of nearest neighbor pixels. An extrapolation may be necessary for calculating a new pixel's color in the case of missing pixels.

Figure 8:
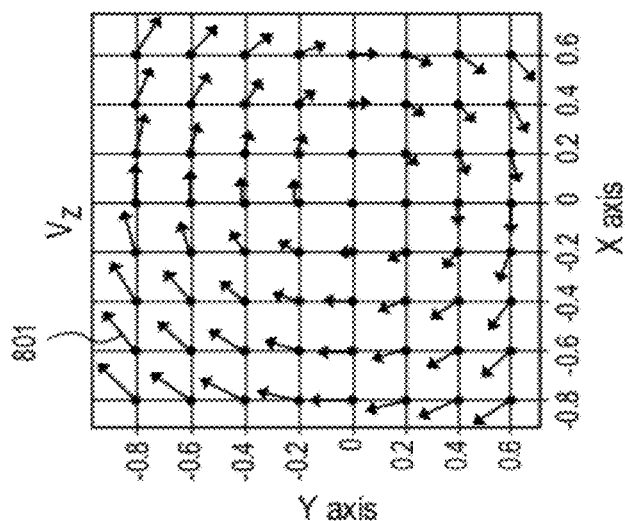
FIGS. 6-8 illustrate pre-computed velocity components (e.g., $V_x$, $V_y$, and $V_z$) in one embodiment of the present invention.
Figure 7:
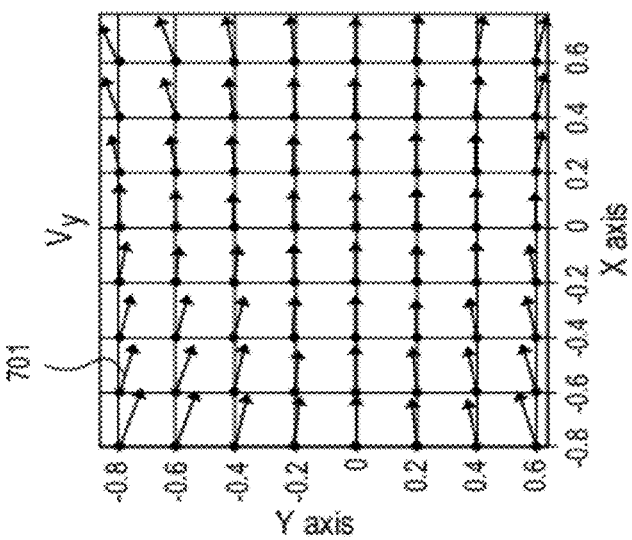
Figure 6:
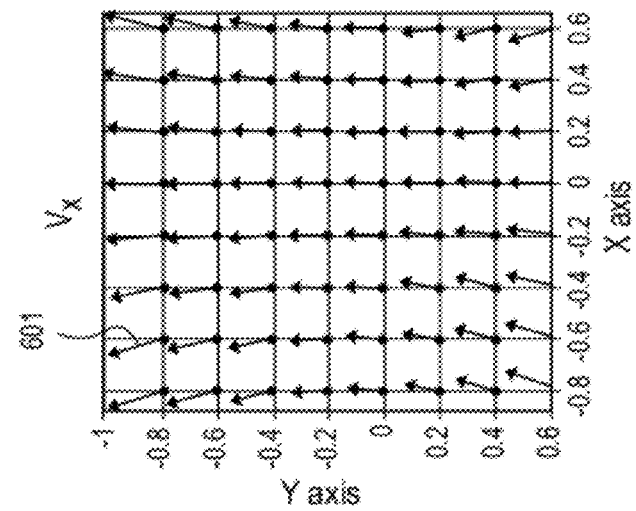

FIGS. 6-8 illustrate pre-computed velocity components (e.g., $V_x$, $V_y$, and $V_z$) in one embodiment of the present invention. The pixels in FIG. 6 move upwards along the y axis (e.g., velocity component 601) due to an estimated or predicted rotational movement of the camera. The pixels in FIG. 7 move to the right along the x axis (e.g., velocity component 701) due to an estimated rotational movement of the camera. The pixels in FIG. 8 move in a clockwise direction (e.g., velocity component 801) due to an estimated rotational movement of the camera. The path of each pixel can be determined based on these velocity components. A pixel velocity field V may be computed from a rotational velocity w and the component velocity maps $V_x$, $V_y$, and $V_z$. The composition of transformations is described as follows.

Vector m→vector x→vector x'→vector m'

The actual pixel coordinates, represented by vector m, of an image plane of the image sensor are mapped or translated into a three dimensional direction vector x. An estimated three dimensional rotation can be applied to the direction vector x to generate vector x'. For example, the estimated or predicted rotation of the camera may correspond to a human model for hand vibration while the human holds the camera. This model may estimate or predict camera rotation for when the user turns his hand slightly in one or more directions during a time period for capturing a row or rows of pixels. In one embodiment, this model is designed for predicted vibrations having a frequency less than or equal to 100 hertz. Vibrations for frequencies greater than 100 hertz are not likely caused by human rotational movement and these vibrations are more difficult to correct. Vector x' is translated into vector m' with function F. The velocity components (e.g., $V_x$, $V_y$, and $V_z$) are approximately equal to a difference between m and m' under incremental rotations about the x, y, and z axis respectively.

Figure 11:
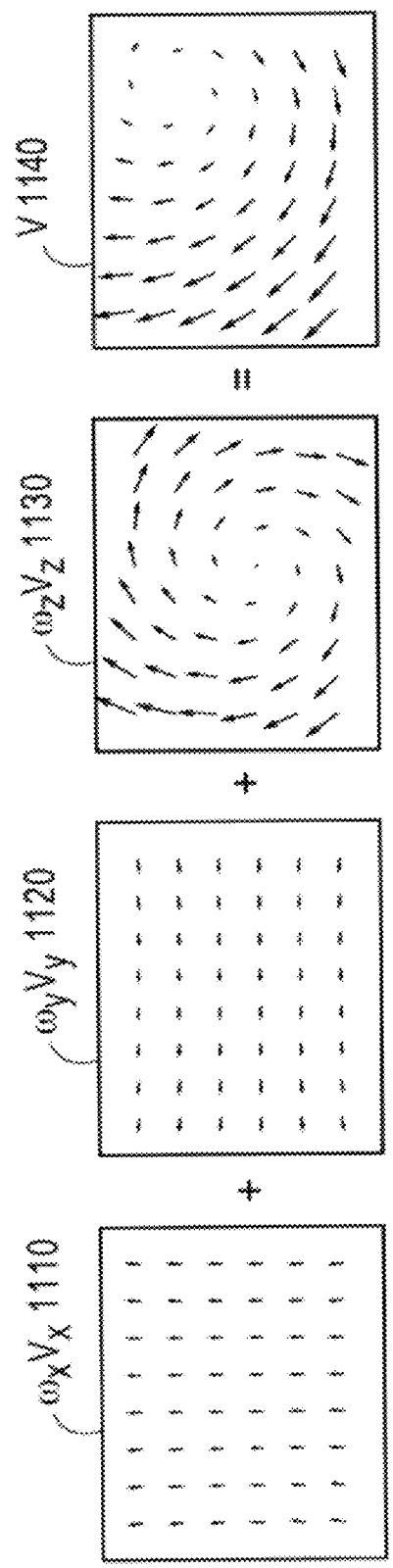
FIG. 11 illustrates aggregating a weighted sum of each pre-computed pixel velocity with weights corresponding to the rotational velocity value for each dimension in one embodiment of the present invention.

FIG. 11 illustrates aggregating a weighted sum of each pre-computed pixel velocity with weights corresponding to the rotational velocity value for each dimension in one embodiment of the present invention. A weighted sum of the components $w_x V_x$ 1110, $w_y V_y$ 1120, and $w_z V_z$ 1130 generates the aggregate pixel velocity vector V 1140. In one embodiment, $w_x$=0.2 radians, $w_y$=-0.2 radians, and $w_z$=0.8 radians.

Figure 12:
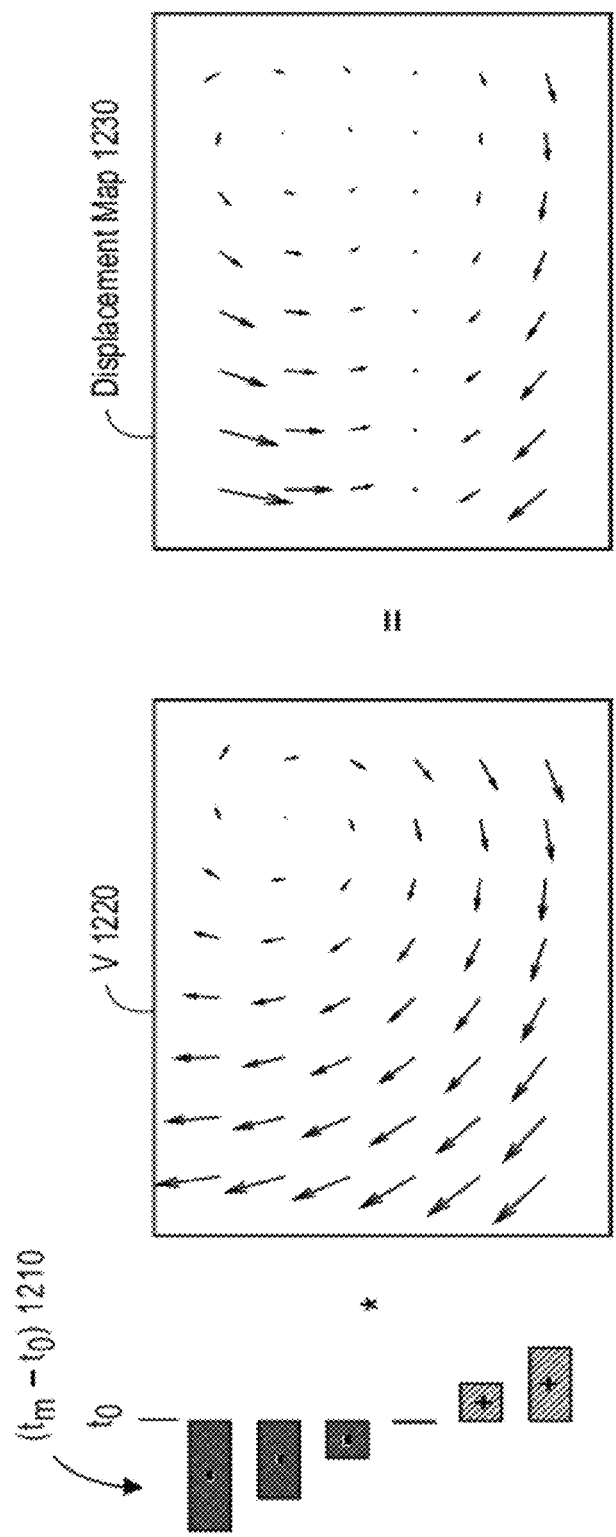
FIG. 12 illustrates the generation of a displacement map based on the aggregate pixel velocity vector V 1220 and $(t_m-t_0)$ 1210 in one embodiment of the present invention.

FIG. 12 illustrates the generation of a displacement map based on the aggregate pixel velocity vector V 1220 and $(t_m-t_o)$ 1210 in one embodiment of the present invention. As discussed above, the time when row m of an image sensor was captured is represented by $t_m$ and an arbitrary time for image capture is represented by $t_o$. Each row of an image sensor is read out at a different time and this is represented by horizontal bars in FIG. 12. For an upper region of an image sensor, $(t_m-t_o)$ 1210 is a negative value. For a lower region of the image sensor, $(t_m-t_o)$ 1210 is a positive value. The displacement map for a given pixel of an image sensor is generated by multiplying the aggregate pixel velocity vector V 1220 and $(t_m-t_o)$ 1210. The displacement map indicates a displacement for a given pixel of the image sensor based on rotation or movement of the camera during image capture.

Figure 13A:
Figure 13B:

FIGS. 13A-13D illustrate a sequence of images for showing a rolling shutter correction in one embodiment of the present invention. FIG. 13A illustrates a reference image 1300, which represents an original scene with stop sign 1302 that was captured with an image-capturing device (e.g., an iPhone 4) with no rolling shutter correction. The reference image 1300 may include radial distortion. FIG. 13B illustrates a simulated image 1310 with stop sign 1312. The simulated image 1310 is a simulated rendering of the image 1300 using a rolling shutter exposure under the effects of an instantaneous rotation of the image-capturing device.

Figure 14:
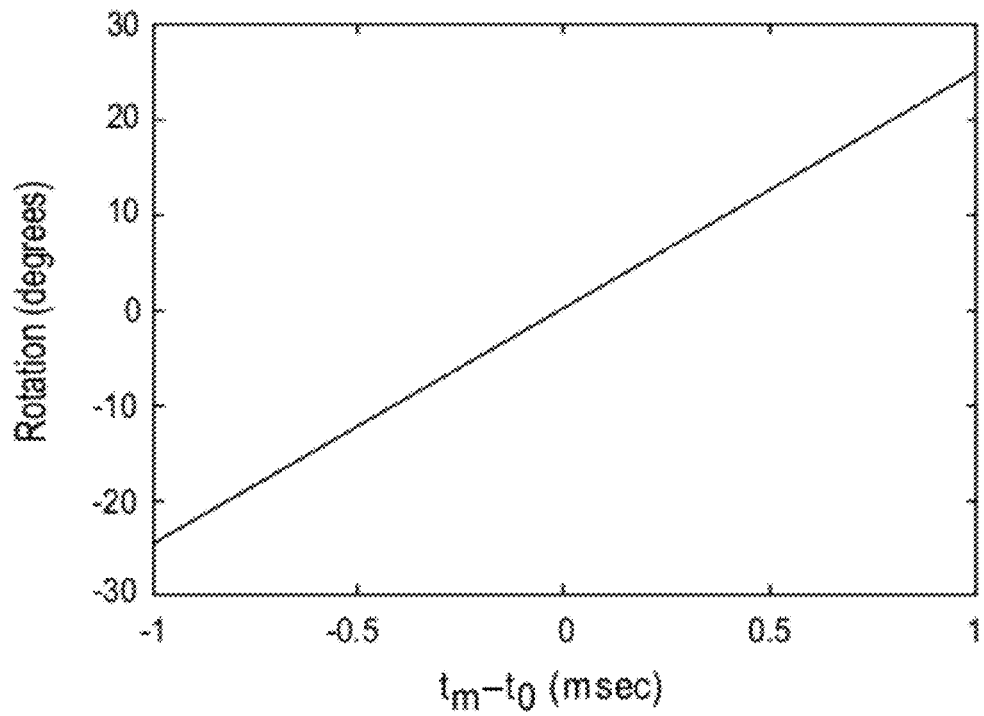
FIGS. 14 and 15 illustrate the instantaneous rotation of the image-capturing device in one embodiment of the present invention.
Figure 15:
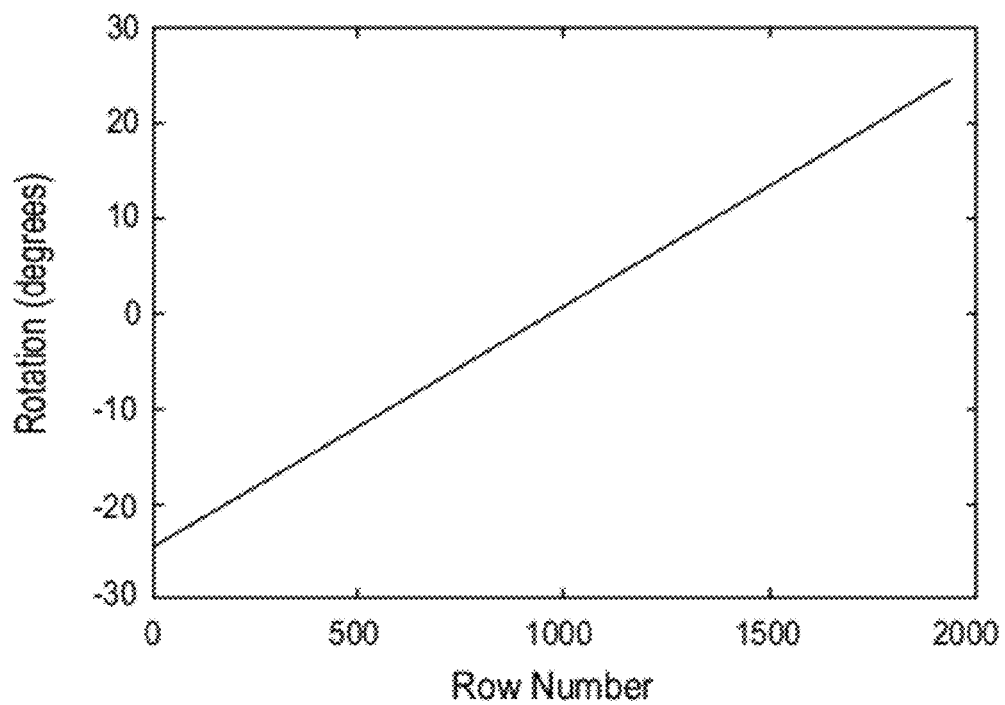

FIGS. 14 and 15 illustrate the instantaneous rotation of the image-capturing device in one embodiment of the present invention. FIG. 14 illustrates the rotation in degrees on a vertical axis versus $t_m-t_o$ in milliseconds on a horizontal axis. For example, for a 2 millisecond exposure time, the image-capturing device rotates from approximately −25 degrees to approximately 25 degrees. FIG. 15 illustrates the rotation in degrees on a vertical axis versus row number of an image sensor of the image-capturing device on a horizontal axis.

FIG. 13C illustrates a resampled image 1320 with stop sign 1322. The image 1320 simulates the unwarping of the image 1310 based on available information, which may be imperfect. In this illustration, the correction is performed using imperfect rotation information with a signal to noise ratio that may be 10:1 (i.e., approximately 4 degrees of error for a rotation of 40 degrees over the exposure interval). In practice, the error may be caused by noise from the motion-estimating device (e.g., gyroscope, accelerometer) measurements as well as modeling errors that result from sources of motion (e.g., motion in the scene, translation, etc.). These sources of motion are difficult to accurately model.

Figure 13D:

FIG. 13D illustrates a resampled image 1330 with stop sign 1332. The image 1330 simulates the unwarping of the image 1310 based on perfect available information. The image 1330 shows what the recovered or resampled image looks like given perfect information about the instantaneous rotation and no other sources of motion (e.g., translation of the observer or movement in the environment). Radial distortion has been removed from this simulated image 1330.

Many of the methods in embodiments of the present invention may be performed with an image-capturing device such as a digital processing system (e.g., conventional, general-purpose computer system). Special purpose computers, which are designed or programmed to perform only one function, may also be used.

Figure 9:
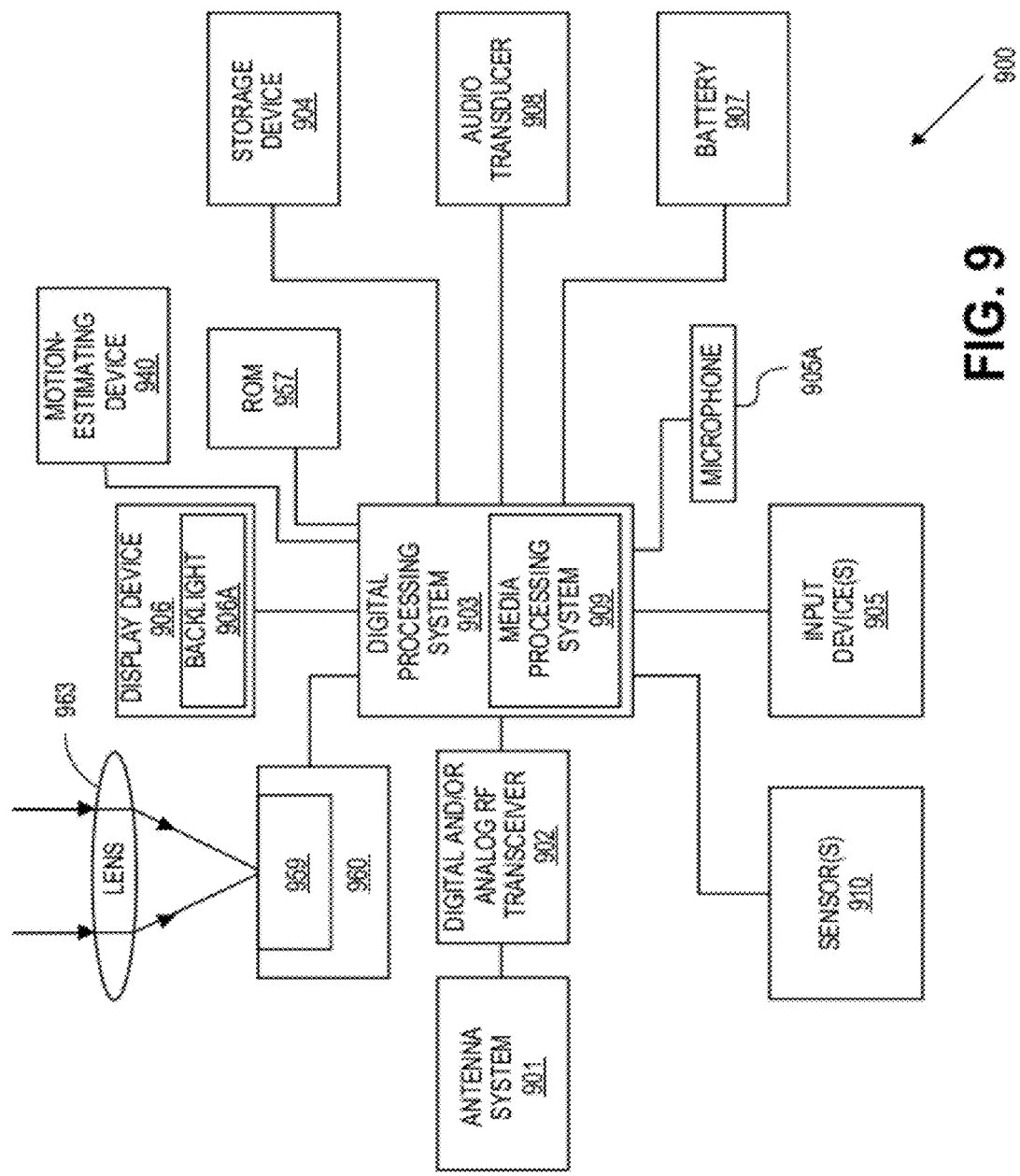
FIG. 9 shows in one embodiment of the present invention a wireless image-capturing device which includes the capability for wireless communication and for capturing images.
Figure 10:
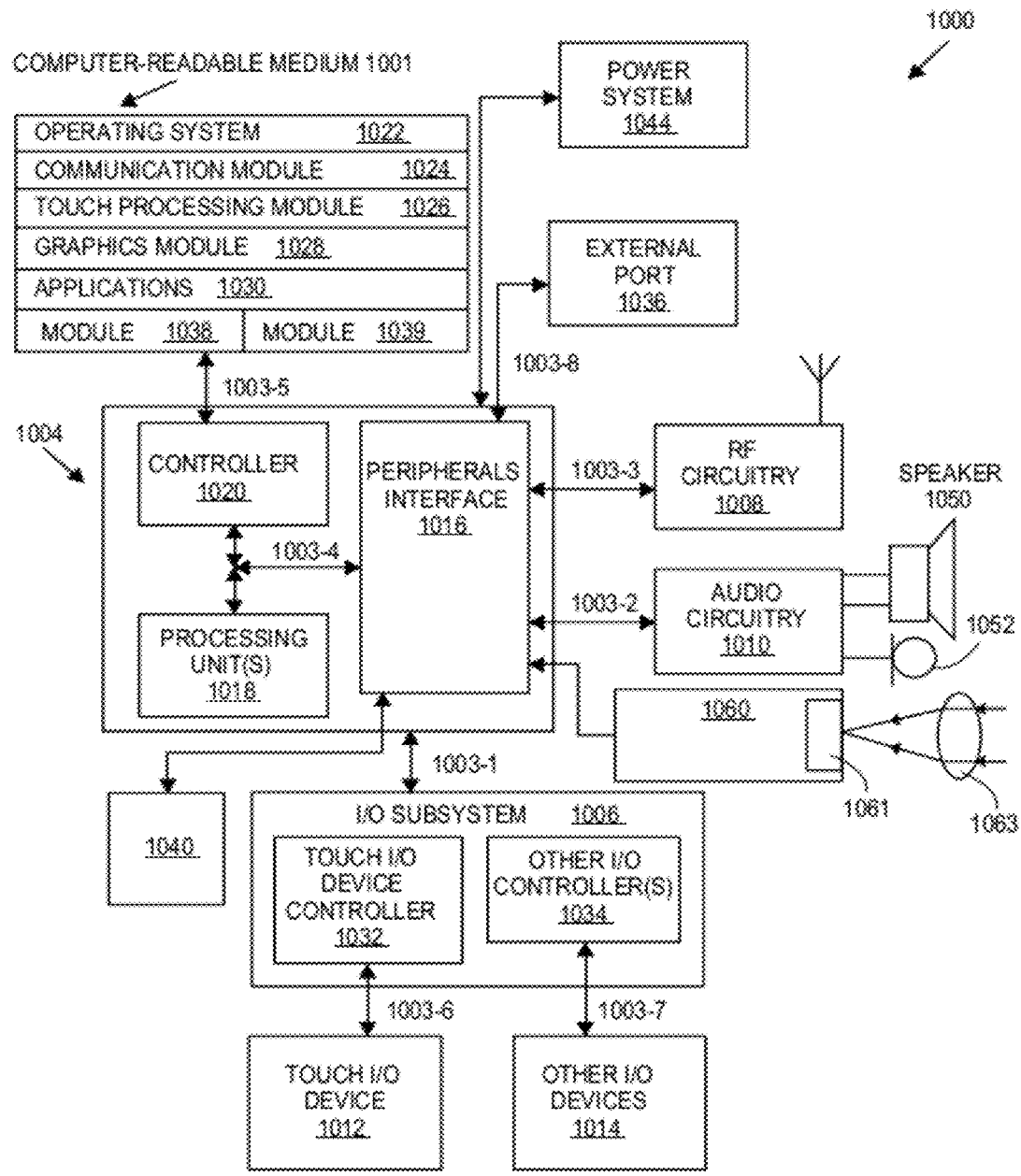
FIG. 10 is a block diagram of one embodiment of the present invention of a system 1000.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices. FIGS. 9 and 10 illustrate examples of a few of these devices, which are capable of capturing still images and video to implement the methods of the present disclosure. The methods (e.g., 100, 500) enhance a user experience for capturing images, capturing video, video calls, etc. based on the image stabilization and rolling shutter correction.

FIG. 9 shows in one embodiment of the present invention a wireless image-capturing device which includes the capability for wireless communication and for capturing images. Wireless device 900 may include an antenna system 901. Wireless device 900 may also include a digital and/or analog radio frequency (RF) transceiver 902, coupled to the antenna system 901, to transmit and/or receive voice, digital data and/or media signals through antenna system 901.

Wireless device 900 may also include a digital processing system 903 to control the digital RF transceiver and to manage the voice, digital data and/or media signals. Digital processing system 903 may be a general purpose processing system, such as a microprocessor or controller for example. Digital processing system 903 may also be a special purpose processing system, such as an ASIC (application specific integrated circuit), FPGA (field-programmable gate array) or DSP (digital signal processor). Digital processing system 903 may also include other devices, as are known in the art, to interface with other components of wireless device 900. For example, digital processing system 903 may include analog-to-digital and digital-to-analog converters to interface with other components of wireless device 900. Digital processing system 903 may include a media processing system 909, which may also include a general purpose or special purpose processing system to manage media, such as files of audio data.

Wireless device 900 may also include a storage device 904, coupled to the digital processing system, to store data and/or operating programs for the Wireless device 900. Storage device 904 may be, for example, any type of solid-state or magnetic memory device. Storage device 904 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 900 may also include one or more input devices 905, coupled to the digital processing system 903, to accept user inputs (e.g., telephone numbers, names, addresses, media selections, etc.) Input device 905 may be, for example, one or more of a keypad, a touchpad, a touch screen, a pointing device in combination with a display device or similar input device.

Wireless device 900 may also include at least one display device 906, coupled to the digital processing system 903, to display information such as messages, telephone call information, contact information, pictures, movies and/or titles or other indicators of media being selected via the input device 905. Display device 906 may be, for example, an LCD display device. In one embodiment, display device 906 and input device 905 may be integrated together in the same device (e.g., a touch screen LCD such as a multi-touch input panel which is integrated with a display device, such as an LCD display device). The display device 906 may include a backlight 906A to illuminate the display device 906 under certain circumstances. It will be appreciated that the wireless device 900 may include multiple displays.

Wireless device 900 may also include a battery 907 to supply operating power to components of the system including digital RF transceiver 902, digital processing system 903, storage device 904, input device 905, microphone 905A, audio transducer 908, media processing system 909, sensor(s) 910, and display device 906, an image sensor 959 (e.g., CCD (Charge Coupled Device), CMOS sensor). The image sensor may be integrated with an image processing unit 960. The display device 906 may include a Liquid Crystal Display (LCD) which may be used to display images which are captured or recorded by the wireless image-capturing device 900. The LCD serves as a viewfinder of a camera (e.g., combination of lens 963, image sensor 959, and unit 960) and there may optionally be other types of image display devices on device 900 which can serve as a viewfinder.

The device 900 also includes an imaging lens 963 which can be optically coupled to image sensor 959. The processing system 903 controls the operation of the device 900; and, it may do so by executing a software program stored in ROM 957, or in the processing system 903, or in both ROM 957 and the processing system 903.

The processing system 903 controls the image processing operation; and, it controls the storage of a captured image in storage device 904. The processing system 903 also controls the exporting of image data (which may or may not be color corrected) to an external general purpose computer or special purpose computer.

The processing system 903 also responds to user commands (e.g., a command to "take" a picture or video by capturing image(s) on the image sensor and storing it in memory or a command to select an option for contrast enhancement and color balance adjustment).

The ROM 957 may store software instructions for execution by the processing system 903 to perform the automatic image stabilization and rolling shutter correction mechanisms discussed in the present disclosure. The storage device 904 is used to store captured/recorded images which are received from the image sensor 959. It will be appreciated that other alternative architectures of a camera can be used with the various embodiments of the invention.

Battery 907 may be, for example, a rechargeable or non-rechargeable lithium or nickel metal hydride battery. Wireless device 900 may also include audio transducers 908, which may include one or more speakers, and at least one microphone 905A, and an accelerometer 946. The device 900 also includes a motion or orientation detector 940 (e.g., accelerometer, gyroscope, or any combination thereof) for determining motion data or an orientation of the device 900.

In one embodiment, the image-capturing device 900 is designed to stabilize images and video. The image-capturing device 900 includes the image sensor 959 with associated calibration data to sense images, the storage device 904 to store captured images, the motion-estimating device 940 to detect motion data for the device, and the processing system 903 which is coupled to the storage device and the motion-estimating device. The processing system is configured to perform an automatic image stabilization mechanism by determining motion data for the image-capturing device using the motion-estimating device, matching motion data to a sequence of frames captured by the image-capturing device to determine three dimensional motion data for each frame, and estimating an estimated motion path (e.g., rough motion path) of the image-capturing device based on the three dimensional motion data for each frame. Determining the three dimensional motion data for each frame includes determining rotational velocity vectors in three dimensions for each frame.

The processing system is further configured to construct a target motion path (e.g., smooth motion path) of the system based on the estimated motion path of the system. Constructing the target motion path may include filtering the estimated motion path. The processing system is further configured to compute a desired motion correction from the estimated motion path to the target motion path.

The processing system is further configured to correct image coordinates of the image plane based on the calibration data and the desired motion correction, which may be determined based on a difference between the target and estimated motion paths of the system, apply resampling for each frame from the original image coordinates to the corrected image coordinates to generate stabilized frames and adaptively crop and fill an unknown region if necessary of the stabilized frames. Correcting image coordinates of the image plane based on the calibration data and the difference between the estimated and target motion paths includes utilizing the calibration data to map the image coordinates, which represent two dimensional pixels, into the normalized image coordinates of the coordinate space, which represent light rays, applying a desired rotation to all light rays, according to the difference between the estimated and target motion paths, and utilizing the calibration data to map these rotated light rays back to the image plane.

Matching motion data to a sequence of frames captured by the image-capturing device to determine three dimensional motion data for each frame may include translating time stamps of the motion-estimating device into video time of the frames and integrating rotational velocity data received from the motion-estimating device to estimate inter-frame rotation.

In another embodiment, an image capturing system (e.g., image-capturing device 900) is designed to correct for rolling shutter effects (e.g., warping) and compensate for vibrations and rotational movements of the image capturing system. The image capturing system includes an image sensor 959 to sense images, a storage device 904 that is coupled to the image sensor. The storage device stores captured images. The motion-estimating device 940 (e.g., gyroscope, accelerometer) detects motion data. The processing system 903 is coupled to the storage device and the motion-estimating device. The processing system is configured to perform an automatic image sensor correction mechanism to utilize calibration data based on a relationship between pixel locations in an image plane of the image sensor and their corresponding rays of light in a three dimensional space, to determine pixel velocity components based on the calibration data, and to estimate for each image an aggregate pixel velocity based on an aggregation of the pixel velocity components.

The pixel velocity components (e.g., $V_x$, $V_y$, and $V_z$) include pre-computed predicted velocity components that are computed prior to sensing the images. Determining the pixel velocity components may include constructing pixel velocity maps from the calibration data. Estimating for each image the aggregate pixel velocity based on the aggregation of the pixel velocity components includes aggregating a weighted sum of each pre-computed pixel velocity corresponding to the rotational velocity value (e.g., $w_x$, $w_y$, and $w_z$) for each dimension.

The processing system is further configured to resample each image to generate a new image to perform the rolling shutter correction mechanism. Resampling each image to generate a new image is based on a current image and the aggregate pixel velocity. The new images have compensated for rolling shutter effects, vibrations, and rotational movement of the image capturing system.

FIG. 10 is a block diagram of one embodiment of the present invention of a system 1000 that generally includes one or more computer-readable mediums 1001, processing system 1004, Input/Output (I/O) subsystem 1006, radio frequency (RF) circuitry 1008, audio circuitry 1010, and an image sensor 1059 (e.g., CCD (Charge Coupled Device), CMOS sensor). The image sensor may be integrated with an image processing unit 1060. The image sensor 1059 is optically coupled to receive light from a lens 1063, which can be used for capturing images with the image sensor. A motion-estimating device 1040 determines motion data in three dimensions for the system 1000. These components may be coupled by one or more communication buses or signal lines 1003.

It should be apparent that the architecture shown in FIG. 10 is only one example architecture of system 1000, and that system 1000 could have more or fewer components than shown, or a different configuration of components. The various components shown in FIG. 10 can be implemented in hardware, software, firmware or any combination thereof, including one or more signal processing and/or application specific integrated circuits.

RF circuitry 1008 is used to send and receive information over a wireless link or network to one or more other devices and includes well-known circuitry for performing this function. RF circuitry 1008 and audio circuitry 1010 are coupled to processing system 1004 via peripherals interface 1016. Interface 1016 includes various known components for establishing and maintaining communication between peripherals and processing system 1004. Audio circuitry 1010 is coupled to audio speaker 1050 and microphone 1052 and includes known circuitry for processing voice signals received from interface 1016 to enable a user to communicate in real-time with other users. In some embodiments, audio circuitry 1010 includes a headphone jack (not shown).

Peripherals interface 1016 couples the input and output peripherals of the system to one or more processing units 1018 and computer-readable medium 1001. One or more processing units 1018 communicate with one or more computer-readable mediums 1001 via controller 1520. Computer-readable medium 1001 can be any device or medium (e.g., storage device, storage medium) that can store code and/or data for use by one or more processing units 1018. Medium 1001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processing units 1018 run various software components stored in medium 1001 to perform various functions for system 1000. In some embodiments, the software components include operating system 1022, communication module (or set of instructions) 1024, touch processing module (or set of instructions) 1026, graphics module (or set of instructions) 1028, one or more applications (or set of instructions) 1030, and modules [or set of instructions] 1038 and 1039. The image stabilization module 1038 and rolling shutter correction module 1039 each correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments.

In some embodiments, medium 1001 may store a subset of the modules and data structures identified above. Furthermore, medium 1001 may store additional modules and data structures not described above.

Operating system 1022 includes various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via RF circuitry 1008 and includes various software components for handling data received from RF circuitry 1008 and/or external port 1036.

Graphics module 1028 includes various known software components for rendering, animating and displaying graphical objects on a display surface. In embodiments in which touch I/O device 1012 is a touch sensitive display (e.g., touch screen), graphics module 1028 includes components for rendering, displaying, and animating objects on the touch sensitive display.

One or more applications 1030 can include any applications installed on system 1000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS), a music player, etc.

Touch processing module 1026 includes various software components for performing various tasks associated with touch I/O device 1012 including but not limited to receiving and processing touch input received from I/O device 1012 via touch I/O device controller 1032.

System 1000 may image stabilization module 1038, rolling shutter correction module 1039, and image capturing unit 1060 for performing the method/functions as described herein in connection with FIGS. 1-10. The image capturing unit 1060 is integrated with the system 1000 and may be coupled to the peripheral interface 1016 as illustrated in FIG. 10 or integrated with one of the I/O devices 1012 or 1014.

In one embodiment, the computer readable medium 1001 contains executable computer program instructions (e.g., module 1038) which when executed by the data processing system 1000 cause said system to perform a method. The method utilizes calibration data of a camera of the system to map image coordinates of an image plane of an image sensor of the camera into normalized image coordinates of a three dimensional coordinate space. The method determines motion data for the system using the motion-estimating device 1040 (e.g., gyroscope, accelerometer). Utilizing the calibration data may include mapping the image coordinates, which represent two dimensional pixels, into the normalized image coordinates of the three dimensional coordinate space, which represent light rays. Determining the three dimensional motion data for each frame may include determining rotational velocity vectors in three dimensions for each frame.

The method also matches motion data to a sequence of frames captured by the system to determine three dimensional motion data for each frame, estimates estimates a motion path (e.g., rough motion path) of the system based on the three dimensional motion data for each frame, constructs a target motion path (e.g., smooth motion path) of the system based on the motion data for each frame, and computes a desired motion correction from the estimated motion path observed in the motion data to the target motion path. The method corrects image coordinates of the image plane based on the desired motion correction and generates stabilized frames based on the corrected image coordinates. Matching motion data to a sequence of frames may include translating time stamps of the motion-estimating device into video time of the frames. Constructing the target motion path may include applying a low-pass or predictive filter in each dimension to the three dimensional motion data used to construct the estimated motion path (possibly inducing a delay), and estimating a necessary correction based on the estimated motion path.

The method also artificially rotates a user's viewing direction based on the desired motion correction, applies bilinear interpolation to generate stabilized frames based on the corrected image coordinates, and adaptively crops and fills an unknown region of the stabilized frames if an unknown region (e.g., dark pixels) exists.

In another embodiment, a computer readable medium contains executable computer program instructions (e.g., module 1039) which when executed by the data processing system 1000 cause said system to perform a method. The method utilizes calibration data for the system, which has an image sensor 1061 and a motion-estimating device 1040 (e.g., gyroscope, accelerometer), by transforming two-dimensional pixel locations in an image plane of the image sensor into a three dimensional direction vector. The method determines pixel velocity components based on the calibration data, captures a sequence of images with the system, determines motion data with the motion-estimating device during image capture, and estimates for each image an aggregate pixel velocity based on an aggregation of the pixel velocity components and corresponding motion data in three dimensions. Estimating may include aggregating a weighted sum of each pre-computed pixel velocity with weights corresponding to the rotational velocity value for each dimension.

The pixel velocity components may include pre-computed velocity components that are computed prior to capturing the sequence of images. Determining the pixel velocity components may include constructing pixel velocity maps from the calibration data.

The method also includes resampling each image to generate a new image.

Resampling each image may occur with a binary interpolation to generate a new image that is based on a current image and the aggregate pixel velocity.

Modules 1038 and 1039 may be embodied as hardware, software, firmware, or any combination thereof. Although modules 1038 and 1039 are shown to reside within medium 1001, all or portions of modules 1038 and 1039 may be embodied within other components within system 1000 or may be wholly embodied as a separate component within system 1000.

I/O subsystem 1006 is coupled to touch I/O device 1012 and one or more other I/O devices 1014 for controlling or performing various functions. Touch I/O device 1012 communicates with processing system 1004 via touch I/O device controller 1032, which includes various components for processing user touch input (e.g., scanning hardware). One or more other input controllers 1034 receives/sends electrical signals from/to other I/O devices 1014. Other I/O devices 1014 may include physical buttons, dials, slider switches, sticks, keyboards, touch pads, additional display screens, or any combination thereof.

If embodied as a touch screen, touch I/O device 1012 displays visual output to the user in a GUI. The visual output may include text, graphics, video, and any combination thereof. Some or all of the visual output may correspond to user-interface objects. Touch I/O device 1012 forms a touch-sensitive surface that accepts touch input from the user. Touch I/O device 1012 and touch screen controller 1032 (along with any associated modules and/or sets of instructions in medium 1001) detects and tracks touches or near touches (and any movement or release of the touch) on touch I/O device 1012 and converts the detected touch input into interaction with graphical objects, such as one or more user-interface objects. In the case in which device 1012 is embodied as a touch screen, the user can directly interact with graphical objects that are displayed on the touch screen. Alternatively, in the case in which device 1012 is embodied as a touch device other than a touch screen (e.g., a touch pad), the user may indirectly interact with graphical objects that are displayed on a separate display screen embodied as I/O device 1014.

Embodiments in which touch I/O device 1012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1000 also includes power system 1044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1016, one or more processing units 1018, and memory controller 1020 may be implemented on a single chip, such as processing system 1004. In some other embodiments, they may be implemented on separate chips. The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer implemented method for image stabilization for an image-capturing device with associated calibration data, the method comprising:
   utilizing camera calibration data of the image-capturing device to map image coordinates of an image plane of an image sensor of the image-capturing device into normalized image coordinates of a three dimensional (3D) coordinate space;
   determining motion data including 3D rotation data for the image-capturing device using a motion-estimating device after utilizing camera calibration data of the image-capturing device to map image coordinates of an image plane of an image sensor of the image-capturing device into normalized image coordinates of a 3D coordinate space;
   matching motion data to a sequence of frames captured by the image-capturing device to determine motion data for each frame;
   constructing a target motion path of the image-capturing device based on the motion data for each frame; and
   computing a desired motion correction from a motion path observed in the motion data to the target motion path.

2. The method of claim 1, further comprising:
   utilizing camera calibration data of the image-capturing device to resample each frame to generate a corrected sequence of stabilized frames according to the desired motion correction; and
   cropping and filling unknown regions of the stabilized frames.

3. The method of claim 1, wherein the image stabilization to correct for rotational motion and vibration of the image-capturing device.

4. The method of claim 3, wherein the calibration data comprises radial distortion, field of view of the image, and center point of the capturing device, or any combination thereof.

5. The method of claim 1, wherein the motion-estimating device comprises a gyroscope, an accelerometer, or any combination thereof.

6. The method of claim 1, wherein determining the motion data for each frame comprises determining rotational velocity vectors in three dimensions for each frame.

7. The method of claim 1, wherein matching motion data to the sequence of frames captured by the image-capturing device to determine motion data for each frame comprises translating time stamps of the motion-estimating device into video time of the frames.

8. The method of claim 7, wherein matching motion data to the sequence of frames captured by the image-capturing device to determine motion data for each frame further comprises integrating rotational velocity data received from the motion-estimating device to estimate inter-frame rotation.

9. A computer readable non-transitory medium containing executable computer program instructions which when executed by a data processing system cause said system to perform a method, the method comprising:
   utilizing calibration data of an image-capturing device to map image coordinates of an image plane of an image sensor of the system into normalized image coordinates of a three dimensional (3D) coordinate space;
   determining motion data including 3D rotation data for the system using a motion-estimating device after utilizing calibration data of the image-capturing device to map image coordinates of an image plane of an image sensor of the system into normalized image coordinates of a three dimensional coordinate space;
   matching motion data to a sequence of frames captured by the system to determine motion data for each frame; and
   constructing a target motion path of the system based on the motion data for each frame; and
   computing a desired motion correction from a motion path observed in the motion data to the target motion path.

10. The computer readable non-transitory medium of claim 9, further comprising:
    utilizing calibration data of the system to correct image coordinates of the image plane based on the desired motion correction; and
    generating stabilized frames based on the corrected image coordinates.

11. The computer readable non-transitory medium of claim 10, wherein utilizing calibration data comprises mapping the image coordinates, which represent two dimensional pixels, into the normalized image coordinates of the three dimensional coordinate space, which represent light rays.

12. The computer readable non-transitory medium of claim 10, further comprising:
    adaptively cropping and filling any unknown region of the stabilized frames.

13. The computer readable non-transitory medium of claim 9, wherein constructing the target motion path of the system comprises applying a lowpass filter in each dimension to the estimated motion path.

14. The computer readable non-transitory medium of claim 9, wherein determining the motion data for each frame comprises determining rotational velocity vectors in three dimensions for each frame.

15. The computer readable non-transitory medium of claim 9, wherein matching motion data to a sequence of frames captured by the system to determine motion data for each frame comprises translating time stamps of the motion-estimating device into video time of the frames.

16. An image-capturing device, comprising:
   an image sensor with associated calibration data to sense images;
   a storage device coupled to the image sensor, the storage device to store captured images;
   a motion-estimating device to detect motion data including three dimensional (3D) rotation data; and
   a processing system coupled to the storage device and the motion-estimating device, the processing system is configured to perform an automatic image stabilization mechanism by utilizing calibration data to map image coordinates, which represent two dimensional pixels, into normalized image coordinates of a three dimensional coordinate space, which represent light rays, subsequently determining motion data for the image-capturing device using the motion-estimating device, matching motion data to a sequence of frames captured by the image-capturing device to determine motion data for each frame, and estimating a motion path of the image-capturing device based on the motion data for each frame.

17. The image-capturing device of claim 16, wherein the processing system is further configured to:
   construct a target motion path of the system based on the estimated motion path of the system;
   compute a desired motion correction from the estimated motion path to the target motion path;
   correct image coordinates of the image plane based on the calibration data and the desired motion correction;
   apply resampling for each frame from the original image coordinates to the corrected image coordinates to generate stabilized frames; and
   crop and fill an unknown region of the image plane.

18. The image-capturing device of claim 17, wherein correcting image coordinates of the image plane based on the calibration data and the desired motion correction comprises:
   utilizing the calibration data to map the image coordinates, which represent two dimensional pixels, into the normalized image coordinates of the coordinate space, which represent light rays;
   applying a desired rotation to all light rays, according to the desired motion correction; and
   utilizing the calibration data to map these rotated light rays back to the image plane.

19. The image-capturing device of claim 17, wherein constructing the target motion path comprises filtering the estimated motion path.

20. The image-capturing device of claim 16, wherein determining the motion data for each frame comprises determining rotational velocity vectors in three dimensions for each frame.

21. The image-capturing device of claim 16, wherein matching motion data to a sequence of frames captured by the image-capturing device to determine motion data for each frame comprises translating time stamps of the motion-estimating device into video time of the frames.

22. The image-capturing device of claim 21, wherein matching motion data to the sequence of frames captured by the image-capturing device to determine motion data for each frame further comprises integrating rotational velocity data received from the motion-estimating device to estimate interframe rotation.

* * * * *